United States Patent
Krishna et al.

(10) Patent No.: US 10,685,050 B2
(45) Date of Patent: Jun. 16, 2020

(54) GENERATING A TOPIC-BASED SUMMARY OF TEXTUAL CONTENT

(71) Applicant: Adobe Inc., San Jose, CA (US)

(72) Inventors: Kundan Krishna, Bangalore (IN); Balaji Vasan Srinivasan, Bangalore (IN)

(73) Assignee: Adobe Inc., San Jose, CA (US)

( * ) Notice: Subject to any disclaimer, the term of this patent is extended or adjusted under 35 U.S.C. 154(b) by 144 days.

(21) Appl. No.: 15/960,505

(22) Filed: Apr. 23, 2018

(65) Prior Publication Data
US 2019/0325066 A1 Oct. 24, 2019

(51) Int. Cl.
G06F 16/34 (2019.01)
G06F 16/33 (2019.01)
G06N 20/00 (2019.01)
G06F 16/31 (2019.01)

(52) U.S. Cl.
CPC .......... *G06F 16/345* (2019.01); *G06F 16/313* (2019.01); *G06F 16/3347* (2019.01); *G06N 20/00* (2019.01)

(58) Field of Classification Search
CPC ..................... G06F 17/22; G06F 17/30719
See application file for complete search history.

(56) References Cited

U.S. PATENT DOCUMENTS

| | | | | |
|---|---|---|---|---|
| 7,809,548 B2 * | 10/2010 | Mihalcea | ................. | G06F 40/30 704/1 |
| 9,037,590 B2 * | 5/2015 | Kumar | .................. | G06F 16/345 707/737 |
| 9,633,005 B2 * | 4/2017 | Danielyan | ............. | G06F 40/284 |
| 9,715,495 B1 * | 7/2017 | Tacchi | .................. | G06F 16/358 |
| 9,881,082 B2 * | 1/2018 | Krishnamurthy | ... | G06F 16/3344 |
| 9,886,501 B2 * | 2/2018 | Krishnamurthy | ....... | G06F 40/30 |

(Continued)

FOREIGN PATENT DOCUMENTS

WO WO2011095923 * 8/2011

OTHER PUBLICATIONS

"Data Science + Journalism @ KDD 2017", Retrieved at: https://sites.google.com/view/dsandj2017/—on Jan. 10, 2018, Aug. 14, 2017, 2 pages.

(Continued)

*Primary Examiner* — Scott T Baderman
*Assistant Examiner* — Mario M Velez-Lopez
(74) *Attorney, Agent, or Firm* — SBMC

(57) ABSTRACT

A word generation model obtains textual content and a requested topic of interest, and generates a targeted summary of the textual content tuned to the topic of interest. To do so, a topic-aware encoding model encodes the textual content with a topic label corresponding to the topic of interest to generate topic-aware encoded text. A word generation model selects a next word for the topic-based summary from the topic-aware encoded text. The word generation model is trained to generate topic-based summaries using machine learning on training data including a multitude of documents, a respective summary of each document, and a respective topic of each summary. Feedback of the selected next word is provided to the word generation model. The feedback causes the word generation model to select subsequent words for the topic-based summary based on the feedback of the next selected word.

20 Claims, 9 Drawing Sheets

(56) References Cited

U.S. PATENT DOCUMENTS

| | | | | |
|---|---|---|---|---|
| 2010/0153318 A1* | 6/2010 | Branavan | ................ | G06F 16/35 706/12 |
| 2010/0287162 A1* | 11/2010 | Shirwadkar | ......... | G06F 16/3338 707/740 |
| 2011/0060983 A1* | 3/2011 | Cai | .................... | G06F 16/9562 715/254 |
| 2011/0257963 A1* | 10/2011 | Zuev | .................... | G06F 40/289 704/9 |
| 2012/0197630 A1* | 8/2012 | Lyons | .................. | G06F 16/345 704/9 |
| 2012/0303357 A1* | 11/2012 | Yasin | ...................... | G06N 7/00 704/9 |
| 2014/0108308 A1* | 4/2014 | Stout | ........................ | G06N 3/08 706/12 |
| 2015/0095770 A1* | 4/2015 | Mani | ..................... | G06F 16/345 715/254 |
| 2015/0106157 A1* | 4/2015 | Chang | ................ | G06Q 30/0201 705/7.29 |
| 2015/0112664 A1* | 4/2015 | Srinivasan | ............. | G06F 40/30 704/9 |

OTHER PUBLICATIONS

Hochreiter, "Long Short-Term Memory", In Neural computation, 1997, Nov. 15, 1997, 32 pages.

Lin, "Automatic Evaluation of Machine Translation Quality Using Longest Common Subsequence and Skip-Bigram Statistics", In Proceedings of the 42nd Annual Meeting of the Association for Computational Linguistics, Jul. 21, 2004, 8 pages.

Nallapati, "Abstractive Text Summarization using Sequence-to-sequence RNNs and Beyond", in 20th SIGNLL Conference on Computational Natural Language Learning (CoNLL), 2016, Aug. 26, 2016, 12 pages.

See, "Get to the Point: Summarization with Pointer-Generator Networks", Apr. 25, 2017, 20 pages.

Sutskever, "Sequence to Sequence Learning with Neural Networks", in Advances in neural information processing systems, 2014., Dec. 14, 2014, 9 pages.

"Combined Search and Examination Report", GB Application No. 1901522.1, dated Aug. 2, 2019, 5 pages.

* cited by examiner

802
Receive, by at least one computing device, a request to generate a topic-based summary of textual content tuned to a topic of interest

804
Encode, by a topic aware encoding model of the at least one computing device, the textual content into topic-aware encoded text

806
Generate, by a word generation model of the at least one computing device, an attention distribution comprising words from the textual content and selection probability values for each word in the attention distribution based on the topic-aware encoded text, the selection probability values indicating a respective probability for each word of being selected as the next word for the topic-based summary of the textual content

808
Select the next word for the topic-based summary based on the attention distribution

810
Provide feedback of the selected word to the word generation model, the feedback causing the word generation model to modify the attention distribution for selection of subsequent words of the topic-based summary based on the feedback of the next selected word

*Fig. 8*

GENERATING A TOPIC-BASED SUMMARY OF TEXTUAL CONTENT

BACKGROUND

Automatic Summarization of textual content can be used to save time for end users by providing an overview of textual content (e.g., a document or an article) which can be quickly read by the user. Conventional extractive summarization techniques extract out key phrases from the input textual content, and then select a subset of these phrases to place in the summary. Summaries generated by these conventional summarization techniques, however, are often not human like. Further, such extractive methods fall short when the length of the desired summaries is small, since this calls for ways to "paraphrase" the input content succinctly to maximize the information conveyed in the summary rather than choosing the most "informative" sentences.

Recent advances in neural networks have led to the use of recurrent neural networks to generate summaries by paraphrasing documents. However, these algorithms allow for the generation of a single summary only. While a summary is supposed to contain the essential part of information in a document, what is characterized as "essential" varies from person to person. Additionally, many documents include subject matter pertaining to more than one topic of interest, such as politics and business. For some readers, business may be the primary area of interest, while some others may be more interested in politics. In this scenario, a single summary may not suit the topic-preferences of all readers.

SUMMARY

To overcome these problems, a topic-based summary of textual content tuned to topics of interest is generated in a digital medium environment. A word generation model obtains textual content and a requested topic of interest, and generates a targeted summary of the textual content tuned to the topic of interest. To do so, a topic-aware encoding model encodes the textual content with a topic label corresponding to the topic of interest to generate topic-aware encoded text. A word generation model selects a next word for the topic-based summary from the topic-aware encoded text. The word generation model is trained to generate topic-based summaries using machine learning on training data including a multitude of documents, a respective summary of each document, and a respective topic of each summary. Feedback of the selected next word is provided to the word generation model. The feedback causes the word generation model to select subsequent words for the topic-based summary based on the feedback of the next selected word.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 8 depicts an example procedure of generating a topic-based summary of textual content using a topic-aware encoding model and a word generation model.

DETAILED DESCRIPTION

Overview

Figure 1:
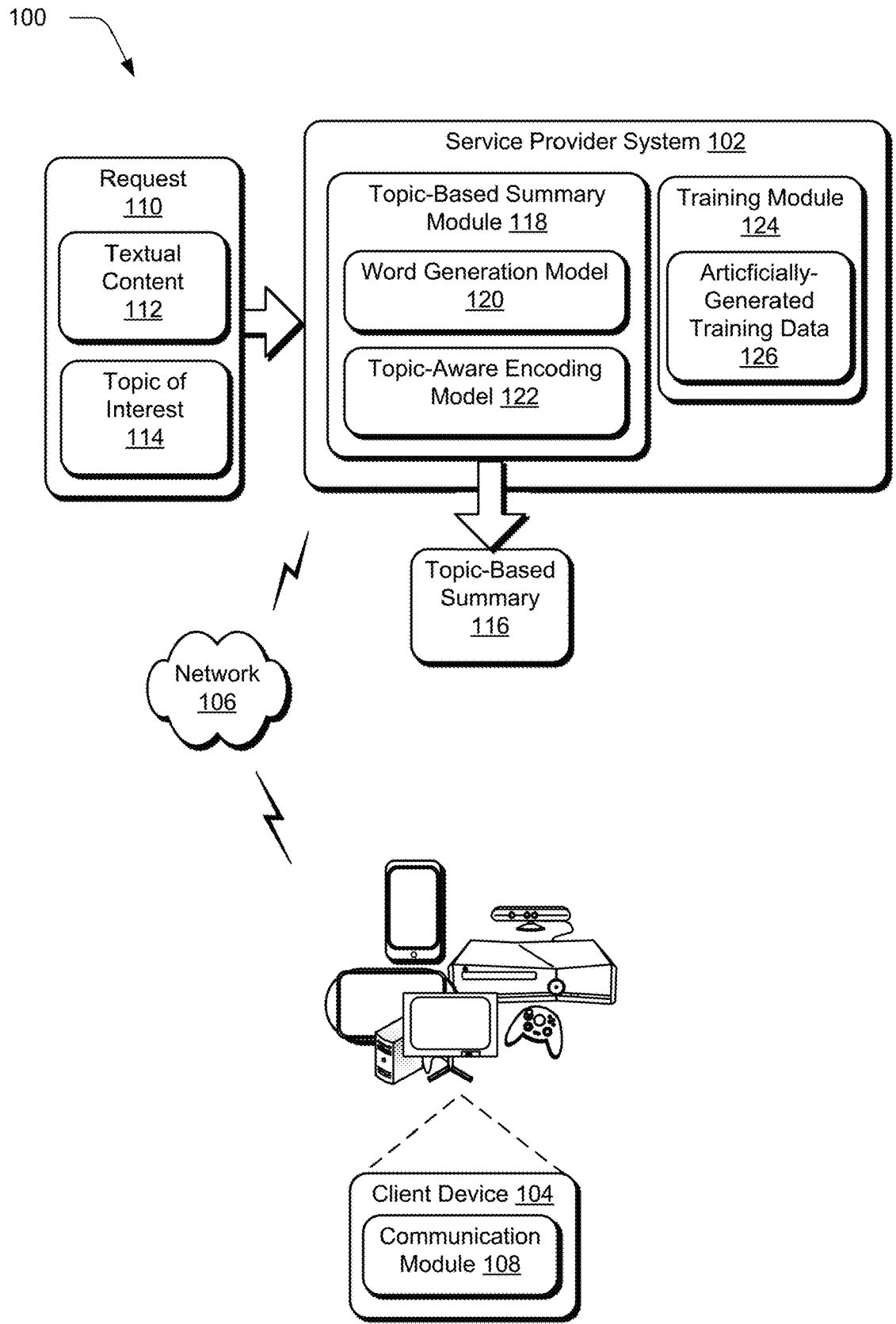
FIG. 1 is an illustration of a digital medium environment in an example implementation that is operable to employ generating a topic-based summary of textual content techniques described herein.

Techniques for generating a topic-based summary of textual content in a digital medium environment are described herein. A topic-based summary module utilizes a word generation model with a topic-aware encoding model to generate summaries of textual content which are tuned to a requested topic of interest. The word generation model may correspond to a machine-learning or rule-based summarization model (e.g., a neural network) which utilizes extractive and/or abstractive summarization techniques to generate topic-based summaries of textual content. The word generation model and the topic-aware encoding model are trained using machine learning techniques on artificially generated training data to generate the topic-based summaries. Notably, the word generation model and topic-aware encoding model can be utilized to generate different summaries tuned to different requested topics of interest for a single document. Thus, the described techniques can tune summary generation to different topics of interests to suit topic-preferences of different readers.

The topic-aware encoding model and the word generation model are trained to generate topic-based summaries tuned to topics of interest using machine learning on training data which includes a multitude of datasets each including a document, a respective summary of the document (e.g., a human-generated summary), and the respective topic of the summary. However, summarization models need a large training corpus of textual content to train the model, and it is difficult to find a large dataset of textual content that include documents and summaries tagged with a topic. Thus, in one or more implementations, the described techniques artificially generate training data usable to train the topic-aware encoding model and the word generation model.

To artificially generate the training data, a supervised word frequency approach is used to learn characterizations of topics (e.g., topic vectors) from a corpus of documents, where each document is tagged with a topic. The learned characterizations of topics are then applied to modify a large untagged corpus of documents and human-generated summaries. To do so, the learned characterizations are applied to each summary to determine a topic of interest of each summary. All of the selected documents and their respective summaries and determined topics are then aggregated into an intermediate dataset.

Finally, the training data is artificially-generated by randomly selecting a first document with a respective first summary and first topic and a second document with a respective second summary and second topic from the intermediate dataset. The first document is then merged with the second document to generate a first new document, which is then associated with the first summary and first topic in the training data. Similarly, the second document is merged with the first document to generate a second new document, which is then associated with the second summary and second topic in the training data. The first document and the second document are then discarded, and these steps are repeated until all of the documents in the intermediate dataset are exhausted. The artificially-generated training data is then used to train the word generation model and the topic-aware encoding model to generate topic-based summaries using machine learning.

The topic-based summary module generates topic-based summaries using the trained topic-aware encoding model and word generation model. To do so, the topic-based summary module receives a request to generate a topic-based summary of textual content tuned to a topic of interest. The inputted text of the textual content is provided to the topic-aware encoding model which encodes the textual content, word by word, into topic-aware encoded text based on the requested topic of interest of the request. Thus, the input text of the textual content is encoded differently based on requested topic of interest for the summary. To encode the textual content based on the topic of interest, the topic-aware encoding model selects a topic label or topic vector (e.g., a one-hot vector) based on the requested topic of interest, and then maps each word of the textual content to an embedding and the selected topic vector representing the topic of interest of the request is attached to each word. This overall concatenated vector is then passed to through the neural network of the topic-aware encoding model which outputs a encoding at each step, leading to a sequence of topic-aware encodings.

The fully encoded text of the textual content is then provided to the word generation model. A decoder of the word generation model generates the topic-based summary by processing the topic-based encodings of the textual content. Since the decoder of the word generation model uses these encodings to generate the summaries, the generated summaries are in turn dependent on the requested topic of interest. To generate the topic-based summary, the word generation model generates an attention distribution of words in the textual content. The attention distribution indicates, for each word, a selection probability value indicating a probability of the corresponding word being selected as a next generated word for the topic-based summary. Encoding the textual content with the topic of interest encourages selection of the most preferred words of the topic of interest learned through training.

The word generation model determines the selection probability value based on the words in the inputted textual content as well the words of the topic-based summary which have already been generated by the word generation model. The described techniques tune the words generated by the word generation model to the topic of interest using the topic-aware encoding model during generation of the topic-based summary. After each word is generated using the word generation model and topic-aware encoding model, feedback regarding the generated word is provided back to the word generation model. The feedback is usable by the word generation model to adjust subsequent generation of word of the summary. Notably, since the inputted textual content is encoded with the topic of interest during generation of the summary, the summary is generated based on both the input text encoded with the topic of interest and the already generated words of the summary. As such, summaries generated using the described techniques generate summaries of textual content tuned to the requested topic of interest.

Thus, the described techniques leverage summarization algorithms to enhance the reading experience and document consumption for readers. In this light, such a topic-tuned summarization algorithm can aid in providing a reader-specific summary of a longer document. Since the size of the documents encountered are typically large, there could be multiple topics in the document and such an approach can help in generating summaries with specific information based on the reader's topic interests.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ generating a topic-based summary of textual content techniques described herein. The illustrated environment 100 includes a service provider system 102 and a client device 104 that are communicatively coupled via a network 106. Computing devices that implement the service provider system 102 and the client device 104 may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as described in FIG. 9.

The client device 104 is illustrated as including a communication module 108 that is representative of functionality to communicate via the network 106, e.g., with the service provider system 102 using a browser, network-enabled application, operating system, and so forth. The communication module 108, for instance, may form a request 110 for a summary of textual content 112 tuned to a topic of interest 114. As described herein, textual content 112 may include any type of textual content, such as articles, word processing documents, text on a web page, PDFs, and so forth. A topic of interest 114, as described herein, may include any type of topic or category, such as business, politics, sports, social, military, tech, education, health, and so forth.

The request 110 can be communicated to the service provider system 102 via network 106. In response to request 110, service provider system 102 generates and returns a topic-based summary 116 of the inputted textual content 112 tuned to the topic of interest 114. A topic-based summary 116, as described herein, corresponds to a short succinct version of the input textual content 112 that is tuned to the requested topic of interest 114. Although illustrated as being implemented remote from client devices 104, functionality of the illustrated service provider system 102 may also be implemented in whole or part locally at the client devices 104. For example, the topic-based summary module 118 can be implemented to generate a topic-based summary 116 locally at the client device 104 from which request 110 is received.

In order to generate the topic-based summary 116, the service provider system 102 employs a topic-based summary module 118 configured to generate the topic-based summary 116 which is tuned to the requested topic of interest 114. The topic-based summary module 118 utilizes both a word generation model 120 configured to generate a summary of textual content, and a topic-aware encoding model 122 trained to encode the inputted textual content 112 with a requested topic of interest 114. The word generation model 120 may correspond to any type of word generation model or algorithm that can generate summaries of textual content. In some cases, the word generation model 120 is trained using machine learning (e.g., a neural network) to generate summaries of textual content. For example, the word generation model 120 may be implemented as an extractive summarization algorithm, an abstractive summarization algorithm, a sequence to sequence neural encoder, and so forth.

Service provider system is further illustrated as including a training module 124 which generates artificially-generated training data 126 ("training data 126") containing a multitude of instances of the form (d,t,s), where d is input document or article, t is the desired topic of a summary, and s is the ideal summary to be generated. The artificially-generated training data 126 is then used by the training module 124 to train the topic-aware encoding model 122 and the word generation model 120 using machine learning techniques.

In one or more implementations, the word generation model 120 generates the words of the topic-based summary 116 using a "word-by-word" summarization process. To generate each "next word" of the topic-based summary 116, the word generation model 120 computes a probability distribution based on a combination of the input text of the textual content 112 and the text of the targeted summary that has already been generated. After each word of the topic-based summary 116 is generated, the word generation model 120 receives feedback regarding the generated word. This feedback is used by the word generation model to generate the subsequent words of the topic-based summary 116. Unlike existing word generation techniques, the word generation model 120 generates words for the targeted summary based on both the context of the input textual content 112 and the words of the summary that have been generated so far. In order to cause the topic-based summary 116 to be tuned to the topic of interest 114, the word-by-word generation process employed by the word generation model 120 is constrained by the topic-aware encoding model 122 which encodes the inputted textual content 112 with topic vectors.

The topic-based summary module 118 may be implemented to provide topic-based summaries 116 for a variety of different use case. In some instances, the topic-based summary module 118 can be utilized by the content author of the textual content 112 (e.g., a content author of an article, paper, or book), to quickly and automatically generate a summary of their textual content 112. The topic-based summary module 118 enables the content author to tune the summary to different topics, which may enable authors to tune the summary to multiple different target audiences. For instance, a content author may want different summaries to be provided at different platforms based on different audiences which frequent such platforms. In other instances, the topic-based summary module 118 may be utilized by customers or end consumers of textual content. In this context, the topic-based summary module 118 may aid in providing a consumer-specific summary of a longer article or paper that can easily be consumed over mobile notifications or on a wearable device. In this instance, the topic-based summary module 118 can be implemented to tune the summary to a requested topic of interest of the consumer.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
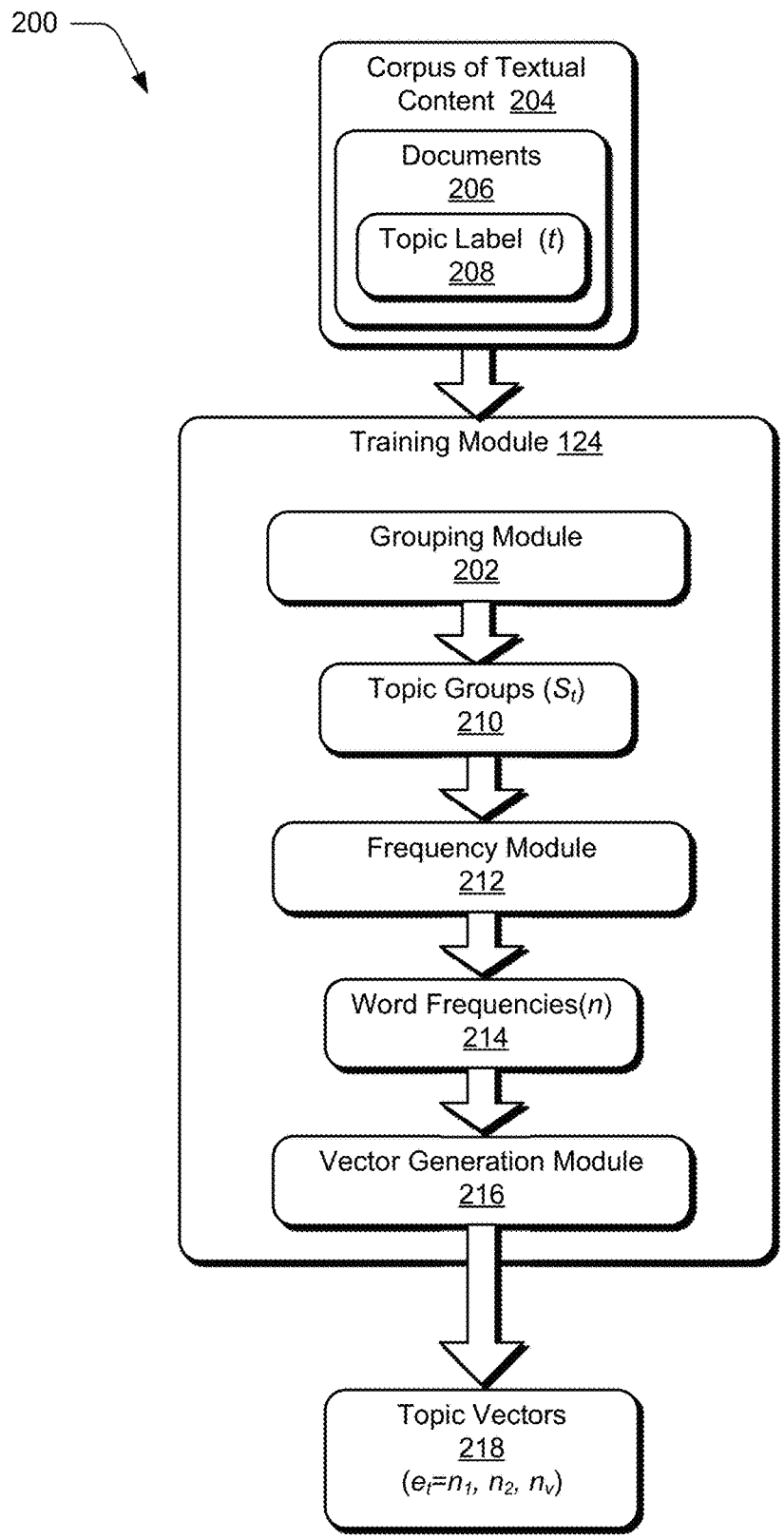
FIG. 2 depicts a system in an example implementation in which topic vectors are learned from a corpus of textual content.

FIG. 2 depicts a system 200 in an example implementation in which topic vectors are learned from a corpus of textual content.

The training module 124 first learns characterizations of topics using a supervised word frequency based approach. In system 200, training module 124 includes a grouping module 202 which receives a corpus of textual content 204 which includes documents 206 tagged with a topic label 208 identifying a topic of each respective document 206. For example, the topic labels 208 can identify topics of each document, such as "politics", "sports", "education", and so forth.

The grouping module 202 groups each document 206 of the corpus of textual content 204 into topic-based groups 210 based on the topic labels 208, such that each document 206 having a topic "t" is included in the topic-based group 210 represented by the set $S_t$.

A frequency module 212 determines word frequencies 214 ("n") for words in each topic-based group 210. The word frequencies 214 correspond to the number of occurrences of a given word in documents 206 of the topic-based group 210. A vector generation module 216 obtains the topic groups 210 and the word frequencies 214, and generates topic vectors 218 ($e_t=(n_1, n_2 \ldots, n_v)$) for each topic t, where $v=|V|$ is the size of vocabulary V of words $\{w_1, w_2, \ldots, w_v\}$ in a given topic group 210 and $n_i$ is frequency (e.g., number of times) that a word $w_1$ occurs in the topic group $S_t$. In some cases, the vector $e_t$ is normalized.

Figure 3:
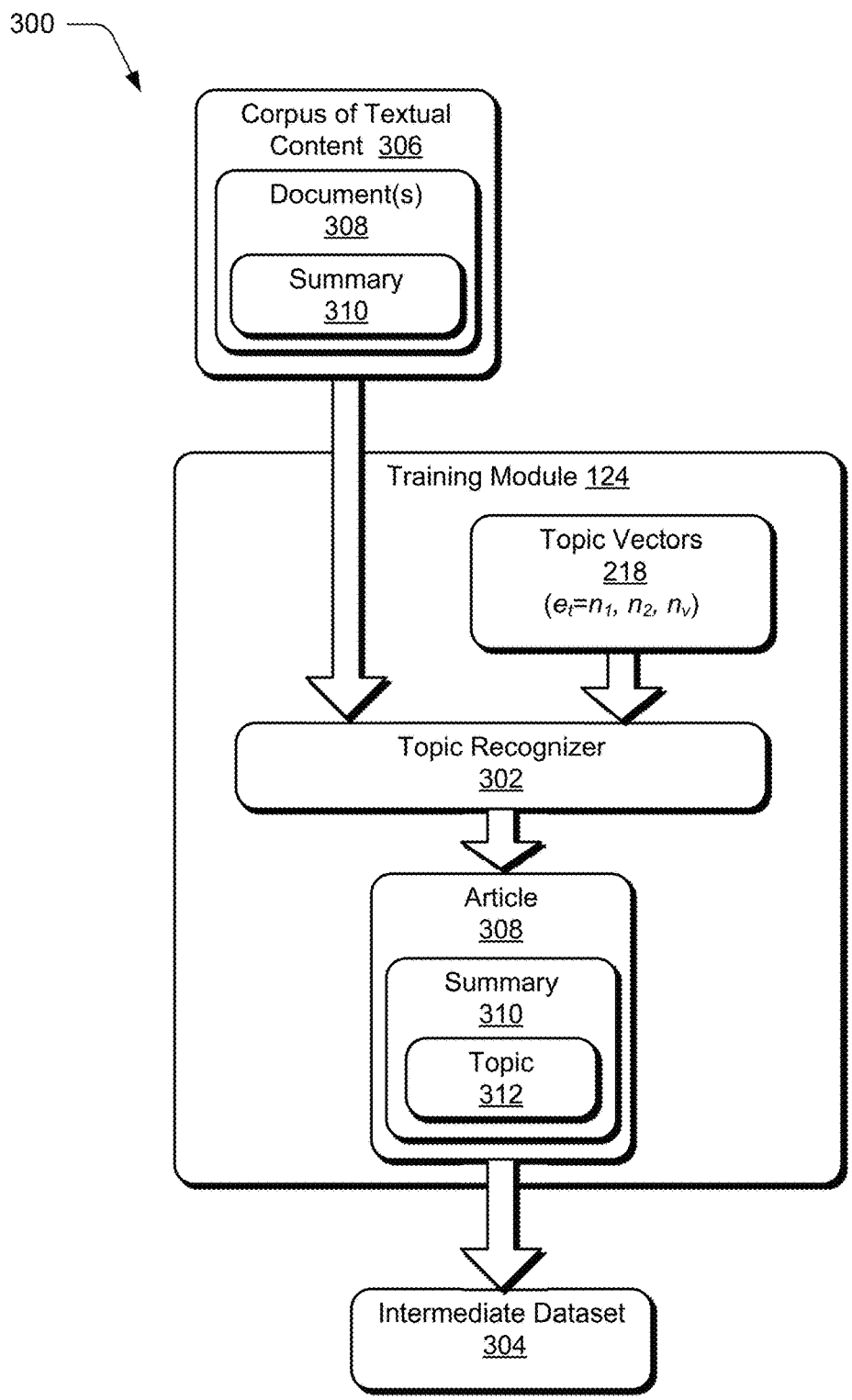
FIG. 3 illustrates a system in which an intermediate dataset is generated by applying the topic vectors to a corpus of textual content including documents with corresponding summaries.

FIG. 3 illustrates a system 300 in which an intermediate dataset is generated by applying the topic vectors to a corpus of textual content including documents with corresponding summaries. In system 300, training module 124 is illustrated as including a topic recognizer 302 which is configured to generate an intermediate dataset 304. To do so, topic recognizer 302 receives a corpus of textual content 306 which includes documents 308 with corresponding human generated summaries 310 as a collection of (document, summary) pairs. The topic recognizer 302 modifies the corpus of textual content 306 to generate the intermediate dataset 304 by determining a topic 312 of each summary 310.

To determine the topic 312 of a summary 310, the topic recognizer 302 applies the topic vectors 218 to each respective summary 310. For example, the topic recognizer 302 computes the dot-product between the summary 310 (in its bag-of-words representation) and the previously extracted topic vectors 218. In this case, $<v_s, e_{t_i}>$ indicates the dot-product between the summary 310 and the topic vector 218 for topic 1. The topic recognizer 302 then selects the topic with the highest computed dot-product as the determined topic 312 for the respective summary 310.

A confidence for the selected topic 312 may be determined based on a comparison of the highest computed dot-product to the second highest dot-product. For example, if $<v_s, e_{t_i}>$ has the highest dot-product value, and $<v_s, e_{t_j}>$ has the second highest dot-product value in the collection of dot-products, then the summary 310 is assigned the topic 312 ($t_i$), with confidence given by $<v_s,e_{t_i}>/<v_s,e_{t_j}>$. In some cases, the document and respective summary is discarded from the intermediate dataset 304 if the confidence is below a threshold. For example, if the confidence is less than a given confidence threshold (e.g., 1.2), then this indicates that the summary does not have a dominant topic of interest, and the document is thus dropped from the intermediate dataset 304. Doing so enables the training module 124 to generate the intermediate dataset 304 to include only those summaries that has the determined topic 312 dominant in the text for training. The training module 124 then aggregates all of the selected documents and their respective summaries 310 and determined topics 312 into a triple <document, topic, summary> for the intermediate dataset 304.

Figure 4:
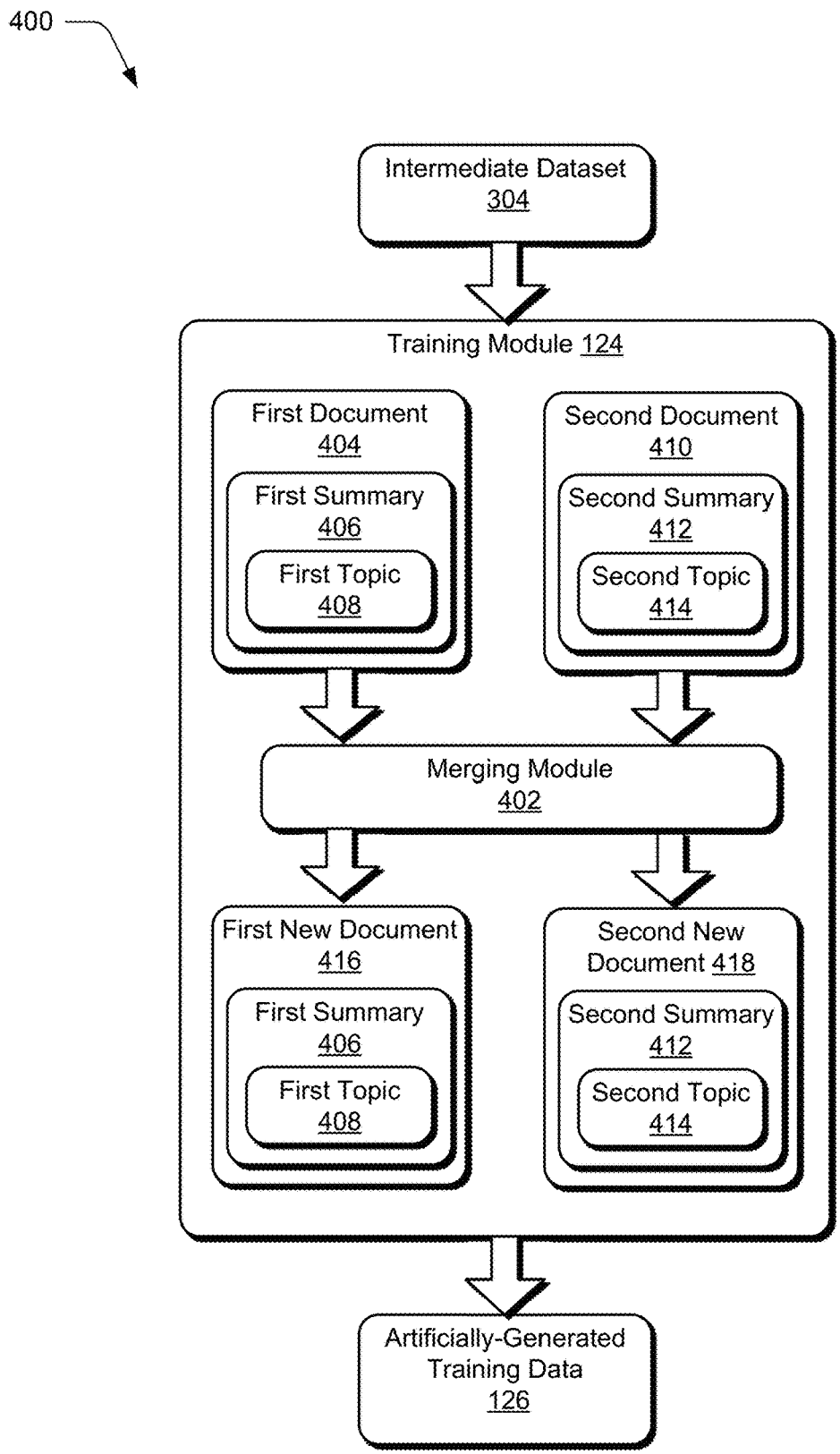
FIG. 4 illustrates a system in which training data is artificially generated.

FIG. 4 illustrates a system 400 in which training data is artificially generated. In system 400, training module 124 obtains the intermediate dataset 304, and generates the artificially-generated training data 126. To do so, a merging module 402 of training module 124 randomly selects a first document 404 and a corresponding first summary 406 with a first topic 408, and a second document 410 with a second summary 412 with a second topic 414 from the intermediate dataset 304, where the first topic 408 and the second topic 414 are different.

Next, merging module 402 generates a first new document 416 by merging text from both the first document 404 and the second document 410. In one or more implementations, the merging module 402 generates the first new document 416 by sequentially picking up lines of text from the first document 404 and the second document 410. In some cases, each addition of new line is done by randomly selecting one of the first document 404 or the second document 410 for extracting the new line. Doing so ensures that the lines of text from the first document 404 or the second document 410 occur in the same order in the first new document 416 as they did in each respective original document. After the first new document 416 is generated, it is grouped with the first summary 406 and first topic 408, and then added to the artificially-generated training data 126.

Next, the merging module 402 repeats the these steps to generate a second new document 418 to be grouped with the second summary 412 and the second topic 414. For example, the merging module 402 generates the second new document 418 by merging text from both the second document 410 and the first document 404. In one or more implementations, the merging module 402 generates the second new document 418 by sequentially picking up lines of text from the second document 410 and the first document 404. In some cases, each addition of new line is done by randomly selecting one of the second document 410 or the first document 404 for extracting the new line. Doing so ensures that the lines of text from the second document 410 and the first document 404 occur in the same order in the second new document 418 as they did in each respective original document. After the second new document 418 is generated, it is grouped with the second summary 412 and the second topic 414, and then added to the artificially-generated training data 126.

In some cases, the training module 124 then discards the first document 404, first summary 406, and first topic 408 as well as the second document 410, second summary 412, and second topic 414 from the intermediate dataset 304. These steps are then repeated until the intermediate dataset 304 is exhausted. The artificially-generated training data 126 is then used to train the word generation model 120 and the topic-aware encoding model 122 to generate topic-based summaries 116 using machine learning.

Figure 5:
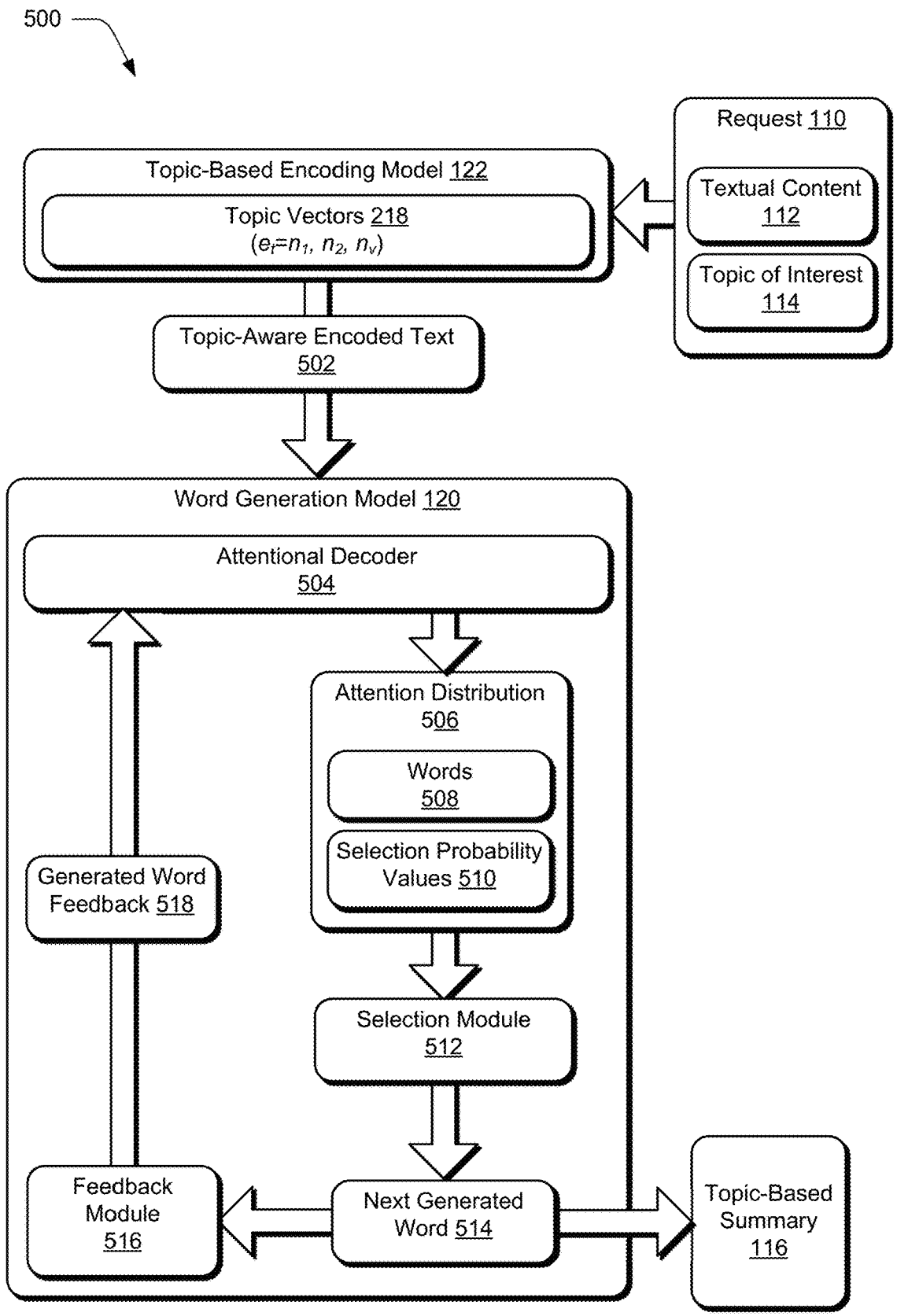
FIG. 5 depicts a system in an example implementation in which the word generation model and the topic-aware encoding model of FIG. 1 generates a topic-based summary of textual content tuned to a topic of interest.

FIG. 5 depicts a system 500 in an example implementation in which the word generation model 120 and the topic-aware encoding model 122 of FIG. 1 generates a topic-based summary 116 of textual content 112 tuned to a topic of interest 114.

In system 500, topic-based summary module 118 receives request 110 to generate a topic-based summary 116 of textual content 112 tuned to a topic of interest 114. In some cases, the request can be received from a content author of the textual content 112, such as an author of an article, book, and so forth. Alternately, the request can be received from a consumer of the textual content 112 in order to generate a summary of the textual content. As described throughout, the request 110 may include the textual content 112 as well as an indication of the topic of interest 114.

Topic-based summary module 118 provides the inputted text of the textual content 112 to the topic-aware encoding model 122. The topic-aware encoding model 122 generates topic-aware encoded text 502 by encoding the textual content 112, word by word, into a sequence of topic-aware encodings based on the topic of interest 114 of the request 110. In other words, the input text of the textual content 112 is encoded differently based on desired topic of interest 114 for the summary. To encode the textual content 112 based on the topic of interest 114, the topic-aware encoding model selects a topic vector 218 (e.g., a one-hot vector) based on the requested topic of interest 114, and then maps each word of the textual content 112 to an embedding and the selected topic vector 218 representing the topic of interest 114 of the request is attached to each word. This overall concatenated vector is then passed to through the neural network of the topic-aware encoding model 122 which outputs a encoding at each step, leading to a sequence of topic based encodings. As discussed above, the topic vectors 218 indicate word preferences of the topic of interest learned from a supervised word frequency based approach.

The topic-aware encoded text 502 of the textual content 112 is then provided to the word generation model 120. An attentional decoder 504 of the word generation model 120 receives the topic-aware encoded text 502 of the textual content 112 as input, and generates an attention distribution 506 of words 508 in the textual content 112. The attention distribution 506 indicates, for each word 508, a selection probability value 510. The selection probability value 510 indicates a probability of the corresponding word 508 being selected as a next generated word for the topic-based summary 116. The attentional decoder 504 determines the selection probability value 510 based on the words in the inputted textual content 112 as well the words of the topic-based summary 116 which have already been generated by the word generation model 120.

The word generation model 120 is further illustrated as including a selection module 512 which is configured to select a next generated word 514 for the topic-based summary 116 based on the attention distribution 506, generated by the attentional decoder 504 of the word generation model 120. Encoding the textual content to generate the topic-aware encoded text increases the selection probability values of preferred words of the topic of interest 114 learned through machine learning training, as discussed above. Thus, encoding the input text encourages selection of the most preferred words of the topic of interest 114 for the summary.

After the next generated word 514 is selected by the selection module 512, the generated word is added to the topic-based summary 116. In addition, a feedback module 516 provides generated word feedback 518 to the attentional decoder 504, which is usable by the attentional decoder 504 to select the subsequent words for the topic-based summary 116, thereby maintaining the coherence in the word generation of the topic-based summary 116.

Figure 6:
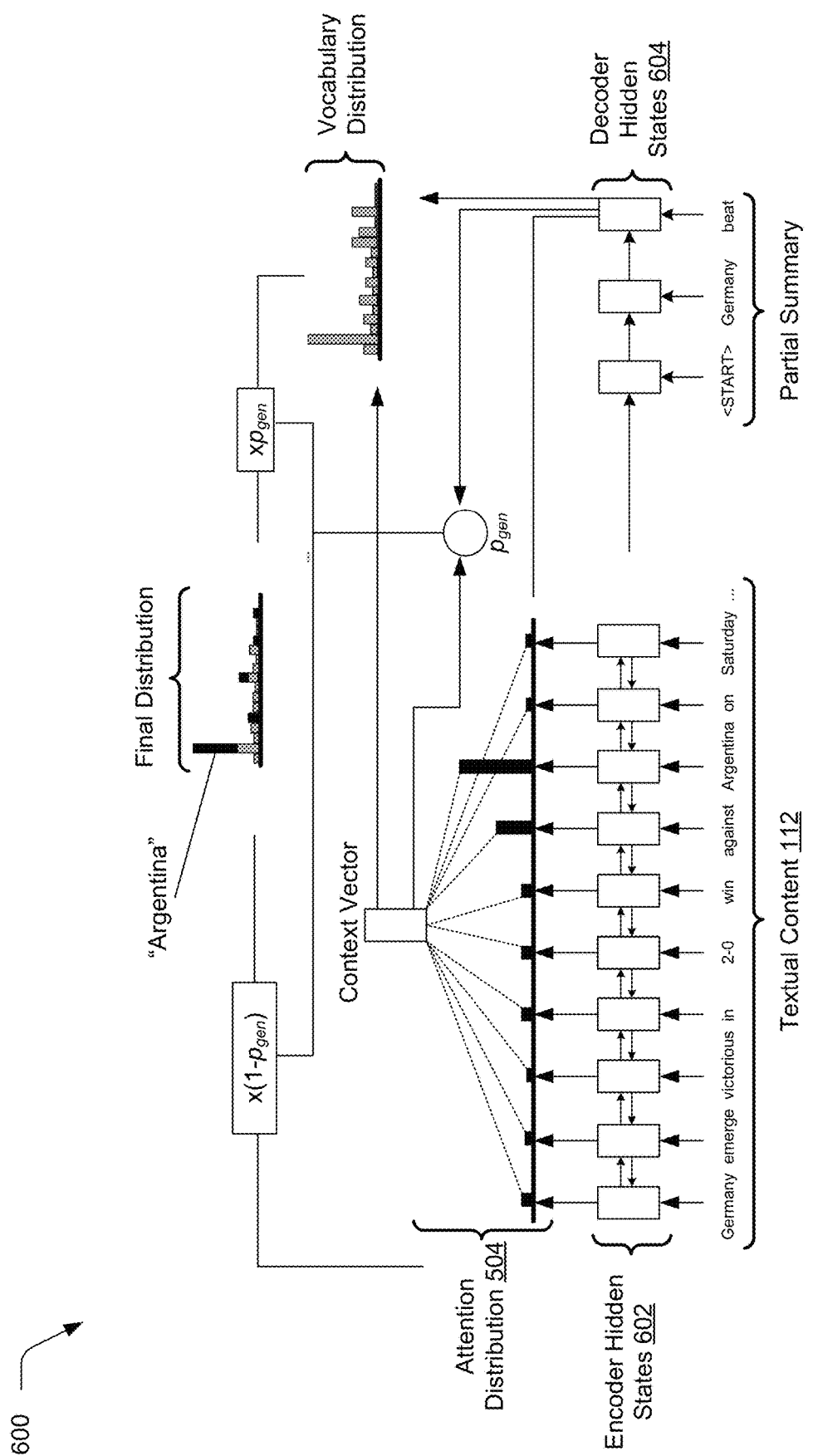
FIG. 6 illustrates an example of word generation model when configured as a neural encoder in accordance with one or more implementations.

FIG. 6 illustrates an example 600 of word generation model 120 when configured as a neural encoder in accordance with one or more implementations.

In example 600, word generation model 120 is implemented as a neural encoder which can be implemented to map a sequence of words to another sequence of words. For example, by training on a large corpus of English sentences and their translations in French, the word generation model 120 can learn to output a French translation of an input sentence. This concept can be applied to configure the word generation model 120 to generate summaries of textual content. To ensure that the next generated word of the summary does not depend on only the previously generated word, the word generation model 120 may utilize a long-short term memory (LSTM) architecture. The LSTM architecture uses a gating mechanism which either retains information in memory, or discards previous information.

In example 600, the LSTM based encoder receives as input the word embedding vectors ("$w_i$") of the input textual content 112, and computes a sequence of encoder hidden states 602 ("$h_i$"). The final hidden state is passed to a decoder, which also computes a decoder hidden states 604 ("$s_t$") and generates a word embedding ("$y_t$") of a target word at each decoding time step.

As discussed throughout, the topic-aware encoding module 122 receives the input textual content 112 as a sequence of words $w_1$ $w_2$ . . . $w_n$, and maps the input words to a sequence of embeddings $e_1$ $e_2$ . . . $e_n$. If there are k topics ($t_1$, $t_2$, . . . , $t_k$), each is represented by a one-hot vector of size k, while ti is represented as (0, 0, . . . 1, 0, 0 . . . ) (e.g., the $i^{th}$ position is set to 1 and rest are set to 0). Thus, if the input textual content 112 is $w_1$ $w_2$ . . . $w_n$, and the topic of interest 114 for the requested summary is 116 is t, then the words of the textual content 112 are mapped to the sequence ($e_1$, t), ($e_2$, t), . . . , ($e_n$, t). Notably, the vector for topic t is appended to each word embedding. The encoded text is then fed into an LSTM based encoder of the topic-aware encoding model which computes a sequence of encoder hidden states 602 ("$h_i$"). The final hidden state of the LSTM-based encoder is also passed to a decoder, which also computes hidden states 604 ("$s_t$") and generates a word embedding ("$y_t$") of a target word at each decoding time step.

While generating a word of the topic-based summary 116, the word generation model 120 focuses more attention to certain parts of the input textual content 112 than others. For example, in example system 600, the word generation model 120 is generating a topic-based summary 116 for the input textual content 112: "Germany emerges victorious in a 2-0 win against Argentina". The word generation model 120 can learn to generate the word "beat" by paying higher attention to the words "victorious" and "win". To do so, the word generation model 120 calculates an attention distribution 504 over all of the words in the textual content 112 using the following algorithm:

$$e_i^t = v^T \tanh(W_h h_i + W_s s_t + b_{att})$$

$$a^t = \text{softmax}(e^t)$$

In the attention distribution algorithm above, v, $W_h$, $W_s$ and $b_{att}$ are trained using machine learning techniques over a corpus of textual content. The attention distribution 504, as discussed above, can be thought of as a probability distribution over words in the input textual content 112 which is learnt from the training corpus. The context vector $h_t^* = \Sigma_i a_i^t h_i$, a weighted sum of the encoder hidden states 602, is used to determine the next word of the summary to be generated based on the words already generated within a defined "context" window.

To reproduce factual pieces of the input textual content 112, the word generation model 120 can be extended to include a probabilistic term to decide whether to generate words as before or to pick up from the input textual content 112 to copy factual details. At each stage of the decoder, the probability $p_{gen}$ is calculated which indicates whether to generate a word from the vocabulary, or copy from the source textual content 112 using the attention distribution 504. This probability can be calculated using the following algorithm:

$$p_{gen} = \sigma(w_h^T h_t^* + w_s^T s_t + w_y^T y_t + b_{gen}),$$

In the algorithm above, $w_h^T$, $w_s^T$, $w_y^T$ and $b_{gen}^t$ are trained based on a training corpus of text. The $p_{gen}$ can then be used to determine the attention distribution 504 over the words in the vocabulary given by the algorithm:

$$P(w) = p_{gen} P_{vocab(w)} + (1 - p_{gen}) \sum_{\{i: w_i = w\}} a_i^t$$

The second term allows the word generation model 120 to choose a word to copy from the input textual content 112 using the attention distribution 504. The P(w) yields the probability of the next word being generated, given the current word and the context.

Example Procedures

This section describes example procedures for generating a topic-based summary of textual content. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 7:
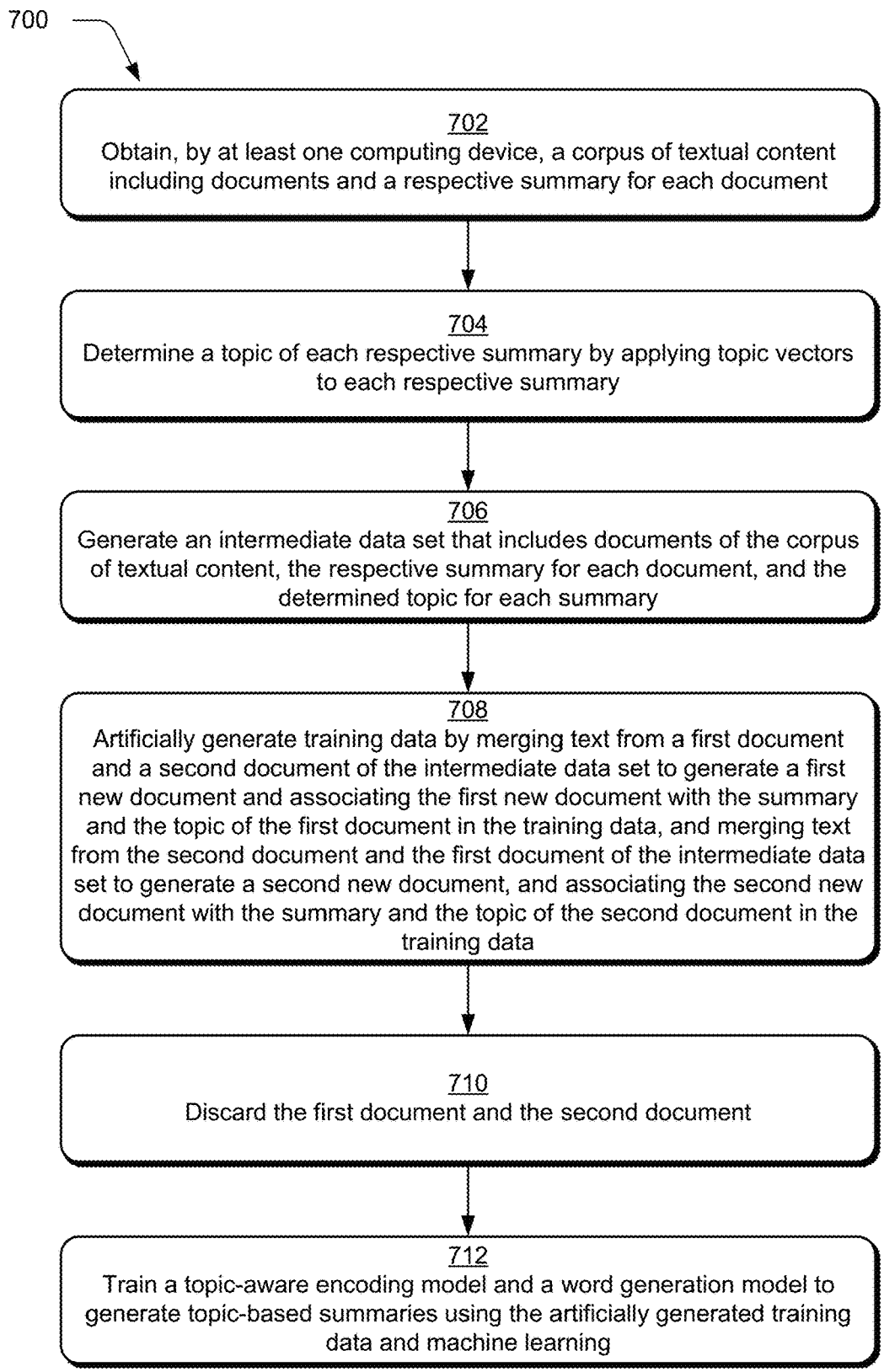
FIG. 7 depicts an example procedure of artificially generating training data to train a topic-aware encoding model and a word generation model using machine learning.

FIG. 7 depicts an example procedure 700 of artificially generating training data to train a topic-aware encoding model and a word generation model using machine learning.

A corpus of textual content including documents and a respective summary for each document is obtained by at least one computing device (block 702). By way of example, topic recognizer 302 of training module 124 receives a corpus of textual content 306 which includes documents 308 with corresponding human generated summaries 310 as a collection of (document, summary) pairs.

A topic of each respective summary is determined by applying topic vectors to each respective summary (block 704). By way of example, the training module 124 first learns characterizations of topics using a supervised word frequency based approach. To do so, a frequency module 212 determines word frequencies 214 for words in each topic-based group 210. The word frequencies 214 correspond to the number of occurrences of a given word in documents 206 of the topic-based group 210. A vector generation module 216 obtains the topic groups 210 and the word frequencies 214, and generates topic vectors 218 for each topic.

To determine the topic 312 of a summary 310, the topic recognizer 302 applies the topic vectors 218 to each respective summary 310. For example, the topic recognizer 302 computes the dot-product between the summary 310 (in its bag-of-words representation) and the previously extracted topic vectors 218. In this case, $<v_s, e_{t1}>$ indicates the dot-product between the summary 310 and the topic vector 218 for topic 1. The topic recognizer 302 then selects the topic with the highest computed dot-product as the determined topic 312 for the respective summary 310.

An intermediate dataset is generated to include documents of the corpus of textual content, respective summaries for each document, and the determined topic for each summary (block 706). For example, the training module 124 aggregates all of the selected documents and their respective summaries 310 and determined topics 312 into a triple <document, topic, summary> for the intermediate dataset 304.

Training data is artificially generated by merging text from a first document and a second document of the intermediate dataset to generate a first new document, and associating the first new document with the summary and the topic of the first document in the training data, and merging text from the second document and the first document of the intermediate dataset to generate a second new document, and associating the second new document with the summary and the topic of the second document in the training data (block 708). For example, a merging module 402 of training module 124 generates a first new document 416 by merging text from both the first document 404 and the second document 410. In one or more implementations, the merging module 402 generates the first new document 416 by sequentially picking up lines of text from the first document 404 and the second document 410. In some cases, each addition of a new line of text is done by randomly selecting one of the first document 404 or the second document 410 for extracting the new line. Doing so ensures that the lines of text from the first document 404 or the second document 410 occur in the same order in the first new document 416 as they did in each respective original document. After the first new document 416 is generated, it is grouped with the first summary 406 and first topic 408, and then added to the artificially-generated training data 126.

Next, the merging module 402 repeats the these steps to generate a second new document 418 to be grouped with the second summary 412 and the second topic 414. For example, the merging module 402 generates the second new document 418 by merging text from both the second document 410 and the first document 404. In one or more implementations, the merging module 402 generates the second new document 418 by sequentially picking up lines of text from the second document 410 and the first document 404. After the second new document 418 is generated, it is grouped with the second summary 412 and the second topic 414, and then added to the artificially-generated training data 126.

The first document and the second document are discarded (block 710). For example, training module 124 discards the first document 404, first summary 406, and first topic 408 as well as the second document 410, second summary 412, and second topic 414 from the intermediate dataset 304. After discarding the first document and the second document, the merging and discarding of steps 708 and 710, respectively, are repeated until the intermediate is exhausted.

The artificially-generated training data is then used to train a topic-aware encoding model and a word generation model to generate topic-based summaries using the artificially generated training data and machine learning (block 712). For example, training module 124 uses the artificially-generated training data 126 to train the word generation model 120 and the topic-aware encoding model 122 to generate topic-based summaries 116 using machine learning.

FIG. 8 depicts an example procedure 800 of generating a topic-based summary of textual content using a topic-aware encoding model and a word generation model.

A request to generate a topic-based summary of textual content tuned to a topic of interest is received by at least one computing device (block 802). By way of example, topic-based summary module 118 receives request 110 to generate a topic-based summary 116 of textual content 112 tuned to a topic of interest 114. In some cases, the request can be received from a content author of the textual content 112, such as an author of an article, book, and so forth. Alternately, the request can be received from a consumer of the textual content 112 in order to generate a summary of the textual content. As described throughout, the request 110 may include the textual content 112 as well as an indication of the topic of interest 114.

The textual content is encoded into topic-aware encoded text by a topic-aware encoding model of the at least one computing device (block 804). By way of example, the topic-aware encoding model 122 generates topic-aware encoded text 502 by encoding the textual content 112, word by word, into a sequence of topic-aware encodings based on the topic of interest 114 of the request 110. In other words, the input text of the textual content 112 is encoded differently based on desired topic of interest 114 for the summary. To encode the textual content 112 based on the topic of interest 114, the topic-aware encoding model selects a topic vector 218 (e.g., a one-hot vector) based on the requested topic of interest 114, and then maps each word of the textual content 112 to an embedding and the selected topic vector 218 representing the topic of interest 114 of the request is attached to each word. This overall concatenated vector is then passed to through the neural network of the topic-aware encoding model 122 which outputs a encoding at each step, leading to a sequence of topic based encodings.

An attention distribution comprising words from the textual content and selection probability values for each word in the attention distribution is generated by a word generation model of the at least one computing device based on the topic-aware encoded text, the selection probability values indicating a respective probability for each word of being selected as the next word for the topic-based summary of the textual content (block 806). For example, an attentional decoder 504 of the word generation model 120 receives the topic-aware encoded text 502 of the textual content 112 as input, and generates an attention distribution 506 of words 508 in the textual content 112. The attention distribution 506 indicates, for each word 508, a selection probability value 510. The selection probability value 510 indicates a probability of the corresponding word 508 being selected as a next generated word for the topic-based summary 116. The attentional decoder 504 determines the selection probability value 510 based on the words in the inputted textual content 112 as well the words of the topic-based summary 116 which have already been generated by the word generation model 120.

The next word for the topic-based summary is selected based on the attention distribution (block 808). For example, a selection module 512 of the word generation model 120 selects a next generated word 514 for the topic-based summary 116 based on the attention distribution 506, generated by the attentional decoder 504 of the word generation model 120.

Feedback is provided of the selected next word to the word generation model, the feedback causing the word generation model to modify the attention distribution for selection of subsequent words of the topic-based summary based on the feedback of the next generated word (block 810). For example, after the next generated word 514 is selected by the selection module 512, the generated word is added to the topic-based summary 116. In addition, a feedback module 516 provides generated word feedback 518 to the attentional decoder 504, which is usable by the attentional decoder 504 to select the subsequent words for the topic-based summary 116, thereby maintaining the coherence in the word generation of the topic-based summary 116.

Having described example procedures in accordance with one or more implementations, consider now an example system and device that can be utilized to implement the various techniques described herein.

Example System and Device

Figure 9:
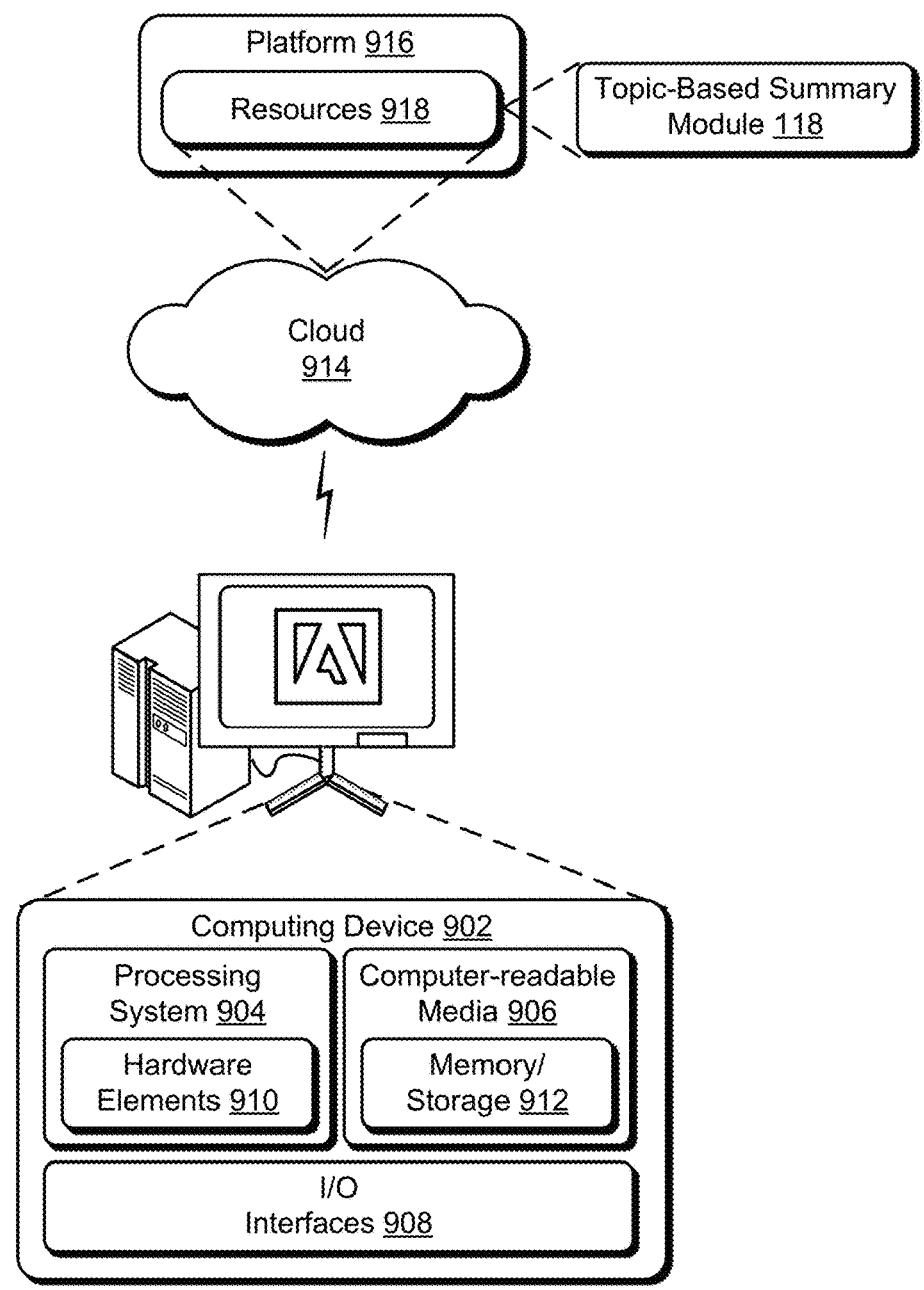
FIG. 9 illustrates an example system that includes an example computing device that is representative of one or more computing systems and/or devices that may implement the various techniques described herein.

FIG. 9 illustrates an example system generally at 900 that includes an example computing device 902 that is representative of one or more computing systems and/or devices that may implement the various techniques described herein. This is illustrated through inclusion of the topic-based summary module 118. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support reader interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate a topic-based summary of textual content tuned to a topic of interest, a method implemented by at least one computing device, the method comprising:

receiving a request to generate the topic-based summary of textual content tuned to the topic of interest, the request including the textual content and defining the topic of interest;

encoding, by a topic-aware encoding model of the at least one computing device, the textual content with a topic label corresponding to the requested topic of interest to generate topic-aware encoded text;

selecting, by a word generation model of the at least one computing device, a next word for the topic-based summary from the topic-aware encoded text, the word generation model trained to generate topic-based summaries using machine learning on training data including a multitude of documents, a respective summary of each document, and a respective topic of each summary; and providing feedback of the selected next word to the word generation model during the generation of the topic-based summary, the feedback causing the word generation model to select subsequent words for the topic-based summary based on both the topic-aware encoded text and the feedback of the selected next selected word; and outputting the topic-based summary of the textual content tuned to the topic of interest, the topic-based summary including words selected by the word generation model.

2. The method as described in claim 1, wherein the encoding further comprises generating the topic-aware encoded text by mapping each word of the textual content to the topic label corresponding to the requested topic of interest.

3. The method as described in claim 2, wherein the topic label indicates word preferences of the topic of interest learned from a supervised word frequency based approach.

4. The method as described in claim 1, wherein encoding the textual content to generate topic-aware encoded text increases selection probability values for preferred words of the topic of interest in the textual content by the word generation model.

5. The method as described in claim 1, wherein the training data is generated by modifying a dataset of documents and respective summaries to include the topic of each summary.

6. The method as described in claim 1, wherein the topic-aware encoding model and the word generation model can be utilized to generate topic-based summaries tuned to multiple different topics of interest.

7. The method as described in claim 1, further comprising:
receiving an additional request to generate a different topic-based summary of the textual content tuned to a different topic of interest, the request including the textual content and defining the different topic of interest; and
outputting the different topic-based summary of the textual content tuned to the different topic of interest.

8. The method as described in claim 1, wherein the topic-aware encoding model and the word generation model comprise a neural network.

9. In a digital medium environment a method implemented by at least one computing device, the method comprising:
obtaining an intermediate dataset comprising documents, a respective summary for each document, and a topic for each summary;
generating training data by:
selecting a first document and a second document from the intermediate dataset;
merging text from a first document and a second document of the intermediate dataset to generate a first new document, and associating the first new document with the corresponding summary and topic of the first document in the training data, and merging text from the second document and the first document of the intermediate dataset to generate a second new document, and associating the second new document with the corresponding summary and topic of the second document in the training data;
discarding the first document and the second document; and
repeating the merging and discarding until the intermediate training dataset is exhausted; and
training a topic-aware encoding model and a word generation model to generate topic-based summaries using the generated training data and machine learning, the training enabling the topic-aware encoding model and the word generation model to generate topic-based summaries tuned to multiple different topics of interest.

10. The method as described in claim 9, further comprising generating the intermediate dataset by:
obtaining, by the at least one computing device, textual content including the documents and the respective summary for each document; and
determining the topic of each respective summary.

11. The method as described in claim 10, wherein the topic of each summary is determined by applying a topic vector to each respective summary, the topic vector generated by:
obtaining, by the at least one computing device, documents tagged with a topic label defining a topic of each respective document;
grouping the documents into topic-based groups based on the topic labels;
determining a frequency of words in the documents of the topic-based groups;
generating, for each topic based group, the topic vector based on the frequency of words in the documents of the topic-based group.

12. The method as described in claim 11, wherein the determining the topic of each respective summary by applying topic vectors to each respective summary further comprises:
for each summary, computing a dot-product between the summary and the topic vectors; and
selecting the topic with the highest computed dot-product as the determined topic of the respective summary.

13. The method as described in claim 12, further comprising:
computing a confidence value of the determined topic by dividing the highest computed dot-product with the second highest dot product; and
discarding the document and respective summary from the intermediate dataset if the confidence value is below a confidence threshold.

14. A system implemented in a digital medium environment to generate a topic-based summary of textual content tuned to a topic of interest, the system comprising:
at least one processor;
memory having stored thereon computer-readable instructions that are executable by the processor to implement a topic-based summary module to perform operations comprising:
receiving a request to generate the topic-based summary of textual content tuned to the topic of interest, the request including the textual content and defining the topic of interest;
encoding, by a topic-aware encoding model the textual content with a topic label corresponding to the requested topic of interest to generate topic-aware encoded text;
selecting, by a word generation model of the at least one computing device, a next word for the topic-based summary from the topic-aware encoded text, the word generation model trained to generate topic-based summaries using machine learning on training data including a multitude of documents, a respective summary of each document, and a respective topic of each summary; and
providing feedback of the selected next word to the word generation model during the generation of the topic-based summary, the feedback causing the word generation model to select subsequent words for the topic-based summary based on both the topic-aware encoded text and the feedback of the selected next selected word; and
outputting the topic-based summary of the textual content tuned to the topic of interest, the topic-based summary including words selected by the word generation model.

15. The system as described in claim 14, wherein the encoding further comprises generating the topic-aware encoded text by mapping each word of the textual content to the topic label corresponding to the requested topic of interest.

16. The system as described in claim 15, wherein the topic label indicates word preferences of the topic of interest learned from a supervised word frequency based approach.

17. The system as described in claim 14, wherein encoding the textual content to generate topic-aware encoded text increases the selection probability values for preferred words of the topic of interest in the textual content by the word generation model.

18. The system as described in claim 14, wherein the topic-aware encoding model and the word generation model are trained to generate topic-based summaries tuned to topics of interest using machine learning on training data, the training data including a multitude of datasets each including a document, a respective summary of the document, and respective topic of the summary.

19. The system as described in claim 18, wherein the training data is generated by modifying a dataset of documents and respective summaries to include the topic of each summary.

20. The system as described in claim 14, wherein the topic-aware encoding model and the word generation model can be utilized to generate topic-based summaries tuned to multiple different topics of interest.

* * * * *